(12) United States Patent
Subramanian et al.

(10) Patent No.: US 7,426,601 B2
(45) Date of Patent: *Sep. 16, 2008

(54) SEGMENTED INTERCONNECT FOR CONNECTING MULTIPLE AGENTS IN A SYSTEM

(75) Inventors: Sridhar P. Subramanian, Cupertino, CA (US); James B. Keller, Redwood City, CA (US); George Kong Yiu, Sunnyvale, CA (US); Ruchi Wadhawan, Sunnyvale, CA (US)

(73) Assignee: P.A. Semi, Inc., Santa Clara, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 11/832,841

(22) Filed: Aug. 2, 2007

(65) Prior Publication Data

US 2007/0271402 A1 Nov. 22, 2007

Related U.S. Application Data

(63) Continuation of application No. 11/201,573, filed on Aug. 11, 2005, now Pat. No. 7,269,682.

(51) Int. Cl.
*G06F 13/00* (2006.01)
*G06F 13/36* (2006.01)

(52) U.S. Cl. .................. 710/316; 710/317; 710/107; 370/254

(58) Field of Classification Search .......... 710/100, 710/305, 116, 244, 72, 316, 317, 107, 113, 710/240; 370/351, 359, 360, 254; 712/28, 712/32; 709/213, 253, 201; 340/825.8; 716/12; 326/38; 713/300, 320
See application file for complete search history.

(56) References Cited

U.S. PATENT DOCUMENTS 5,081,575 A  1/1992  Hiller et al.

(Continued)

OTHER PUBLICATIONS

"Distributed protocols for access arbitration in tree-structured communication channels" by Melen et al. (abstract only) Publication Date: Mar. 1991.*

(Continued)

*Primary Examiner*—Glenn A Auve
(74) *Attorney, Agent, or Firm*—Lawrence J. Merkel; Meyertons, Hood, Kivlin, Kowert & Goetzel, P.C.

(57) ABSTRACT

In various embodiments, an apparatus comprises a plurality of agents and an interconnect. In one embodiment, the plurality of agents includes first through fourth agents. The interconnect comprises a plurality of segments that are switchable (e.g. using a plurality of selection circuits) to form communication paths between the agents, and a first segment is included in a first communication path from the first agent to the second agent, and is also included in a second communication path from the third agent to the fourth agent. In another embodiment, each segment is driven by a selection circuit. At least one selection circuit has at least one segment and an output from at least one agent as inputs. In yet another embodiment, an arbiter is configured to determine a communication path on the interconnect for each requesting agent to the destination agent over the segments. The arbiter is configured to arbitrate among a subset of requests for which each segment in the corresponding communication path is available.

20 Claims, 7 Drawing Sheets

U.S. PATENT DOCUMENTS

| | | | |
|---|---|---|---|
| 5,448,496 A | 9/1995 | Butts et al. | |
| 5,524,235 A * | 6/1996 | Larson et al. | 711/151 |
| 6,026,461 A | 2/2000 | Baxter et al. | |
| 6,157,989 A * | 12/2000 | Collins et al. | 711/151 |
| 6,195,335 B1 | 2/2001 | Calvignac et al. | |
| 6,343,081 B1 * | 1/2002 | Blanc et al. | 370/411 |
| 6,460,174 B1 | 10/2002 | Carey | |
| 6,601,126 B1 | 7/2003 | Zaidi et al. | |
| 6,604,230 B1 | 8/2003 | Khalid et al. | |
| 6,606,300 B1 * | 8/2003 | Blanc et al. | 370/229 |
| 6,665,760 B1 * | 12/2003 | Dotson | 710/240 |
| 6,769,046 B2 | 7/2004 | Adams et al. | |
| 6,954,811 B2 * | 10/2005 | Vishnu | 710/113 |
| 7,199,607 B2 * | 4/2007 | Volkening et al. | 326/38 |
| 7,203,202 B2 * | 4/2007 | Chao et al. | 370/414 |
| 7,269,682 B2 | 9/2007 | Subramanian et al. | |
| 7,275,121 B1 * | 9/2007 | Wong et al. | 710/240 |
| 2002/0159474 A1 | 10/2002 | Apostol et al. | |
| 2005/0071533 A1 | 3/2005 | Adams et al. | |

OTHER PUBLICATIONS

Ahmadi, et al., "A Survey of Modern High-Performance Switching Techniques," (abstract only), Publication date of Sep. 1989.

* cited by examiner

United States Patent US 7,426,601 B2

SEGMENTED INTERCONNECT FOR CONNECTING MULTIPLE AGENTS IN A SYSTEM

This application is a continuation of U.S. patent application Ser. No. 11/201,573, filed on Aug. 11, 2005, now U.S. Pat. No. 7,269,682.

BACKGROUND

1. Field of the Invention

This invention is related to the field of integrated circuits and, more particularly, to interconnect within and/or between integrated circuits.

2. Description of the Related Art

Integrated circuits in a system, or various circuitry within an integrated circuit, typically have a need to communicate with each other. In many cases, communicators in the system/integrated circuit may communicate through various addresses in a memory map. That is, various communicators are assigned addresses within the memory map, and reads/writes to the addresses are used to communicate. Typically, such communicators use read/write transactions transmitted over an interconnect between the communicators.

For example, it is common to have an address bus over which the address, command, and other transaction information is transmitted to initiate a transaction. Additionally, a data bus may be used to transmit data corresponding to the transaction, if any. If cache coherency is implemented for the transactions, a response interface may be provided for maintaining the coherency states according to the coherency scheme implemented by the communicators. The bandwidth of the address bus and the data bus is somewhat limited, since only one address transfer can be transmitted on the address bus and only one data transfer can be transmitted on the data bus at a time. If two or more transfers could be done in parallel, the bus structure does not permit the parallelism. Additionally, buses tend to have high power consumption, as each communicator is coupled to the buses and presents a capacitive load to the driver of the bus.

Another interconnect that is often used is referred to as a crossbar. A crossbar typically permits each transmitting communicator to communicate with any receiving communicator, and any other transmitting communicator to communicate with any other receiving communicator, in parallel. However, the circuitry required in the crossbar to permit any set of concurrent connections between transmitters and receivers often leads to high power consumption.

SUMMARY

In one embodiment, an apparatus comprises a first agent, a second agent, a third agent, a fourth agent, and an interconnect. Each of the first through fourth agents are coupled to the interconnect, which comprises a plurality of segments that are switchable to form communication paths between the agents coupled to the interconnect. A first segment of the plurality of segments is included in a first communication path from the first agent to the second agent, and is also included in a second communication path from the third agent to the fourth agent.

In another embodiment, an apparatus comprises a plurality of agents coupled to an interconnect. The interconnect comprises a plurality of segments and a plurality of selection circuits, wherein each of the plurality of segments is driven by a respective one of the plurality of selection circuits. At least one selection circuit has at least one of the plurality of segments and an output from at least one of the plurality of agents as inputs. A communication path from a first agent of the plurality of agents to a second agent of the plurality of agents is established by configuring one or more of the plurality of selection circuits to couple an output of the first agent to an input of the second agent.

In yet another embodiment, an apparatus comprises a plurality of agents coupled to an interconnect. The interconnect comprises a plurality of segments and a plurality of selection circuits configurable to establish communication paths on the plurality of segments between the plurality of agents. An arbiter is coupled to the plurality of agents and the interconnect, and is coupled to receive requests to use the interconnect from the plurality of agents, Each requesting agent is configured to identify a destination agent for the request, and the arbiter is configured to determine a communication path on the interconnect for each request from the requesting agent to the destination agent over one or more of the plurality of segments. The arbiter is configured to arbitrate among a subset of the requests for which each segment in the corresponding communication path is available.

BRIEF DESCRIPTION OF THE DRAWINGS

The following detailed description makes reference to the accompanying drawings, which are now briefly described.

Figure 1:
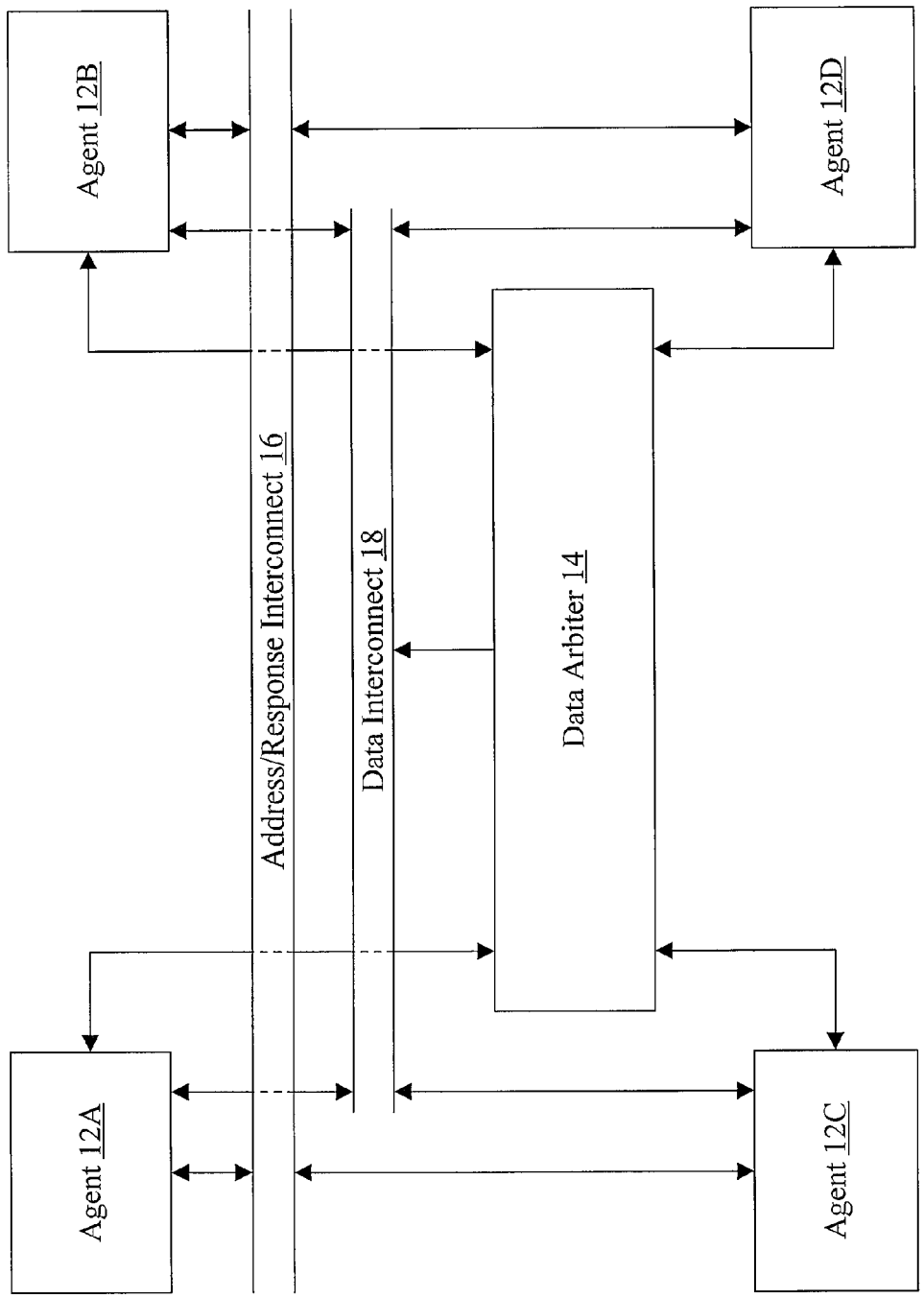
FIG. 1 is a block diagram of one embodiment of an integrated circuit.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Turning now to FIG. 1, a block diagram of one embodiment of a system 10 is shown. In the illustrated embodiment, the system 10 includes a plurality of agents such as agents 12A-12D. The system also includes an address/response interconnect 16, a data interconnect 18, and a data arbiter 14. The agents 12A-12D are coupled to the data arbiter 14 and to the data interconnect 18. Additionally, the agents 12A-12D are coupled to the address/response interconnect 16. The data arbiter 14 is further coupled to the data interconnect 18. In one embodiment, the system 10 may be integrated onto a single integrated circuit chip. In other embodiments, various components of the system 10 may be implemented on separate integrated circuits. Any level of integration may be used in various embodiments.

At least some of the agents 12A-12D are configured to initiate transactions to communicate with other agents 12A-12D in the system 10. The transactions may include an address phase on the address/response interconnect 16 and a data phase on the data interconnect 18. Coherent transactions may include a response phase on the address/response interconnect 16 as well.

The address/response interconnect 16 may comprise any communication medium. For example, in one embodiment, the address/response interconnect 16 may be arbitrated among source agents. A centralized arbitration scheme may be used in which the source agents transmit address phase requests (including the address, command, etc. of the transaction) to the centralized arbiter, which may queue the requests, arbitrate among them, and transmit the winning transaction on the address/response interconnect 16. Other embodiments may use any other desired communication medium.

The agents 12A-12D may arbitrate for use of the data interconnect 18 as well, to perform the data phases of transactions. The agents 12A-12D may signal requests for the data interconnect 18 to the data arbiter 14, which may arbitrate among the requests and select an arbitration winner. The data arbiter 14 may signal the winning agent 12A-12D, which may drive data on the data interconnect 18 responsive to the grant. Any is arbitration scheme may be used (e.g. priority, round-robin, weighted round-robin, a combination of priority and various round-robin schemes, etc.).

In one embodiment, the data interconnect 18 may comprise a partially-populated crossbar. The data interconnect 18 may support a certain amount of concurrency (or parallelism) for data transfer, but may not implement a full crossbar. A combination of high bandwidth and low power may be supported, in some embodiments, with the reduced circuitry included in the data interconnect 18. In one implementation, the data interconnect 18 may comprise a set of segments coupled by selection circuits such as multiplexors (muxes). The data arbiter 14 may control the muxes to establish a communication path from one agent 12A-12D to another over some of the segments. Some of the segments may be shared by different communication paths, and thus if one of the communication paths is in use, the other communication paths that use a shared segment may not be established until completion of the data phase on the established communication path. The data arbiter 14 may be configured to determine the communication path for each requested data phase, and may mask requests for which at least one segment of the desired communication path is in use. Additional details for one embodiment of the data interconnect 18 are provided below with regard to FIGS. 2-7.

One or more of the agents 12A-12D may be configured to initiate transactions in the system 10. Such agents may be referred to as source agents. Exemplary source agents may include processors, external write back caches (which source write transactions to write evicted cache blocks that have been modified to memory), and input/output (I/O) bridges (which source transactions on behalf of peripheral devices to which they are coupled). Other agents may not source transactions, but may be the target of a transaction (that is, the agent that receives the transaction and is responsible for the data of the transaction). Such agents are referred to as target agents. For read transactions, the target agent supplies the data unless another agent has a more recent (modified) cached copy of the data. For write transactions, the target agent sinks the write data supplied by the source agent. Target agents may include, for example, memory controllers and I/O bridges. Thus, for read transactions, the target agent may arbitrate for the data interconnect 18 and may transmit data on the data interconnect 18. For write transactions, the source agent may arbitrate for the data interconnect 18 and transmit data on the data interconnect 18. Some agents may be both a source agent for some transactions and a target agent for other transactions. Exemplary source/target agents may include the I/O bridge or external cache mentioned above. Generally, an agent may comprise any circuitry that is configured to communicate via transactions on the address/response interconnect 16 and the data interconnect 18.

As used herein, a segment may refer to one or more conductors such as wires. If more than one conductor is included in a segment, the conductors may be driven in parallel to carry multi-bit values from one end of the conductor to the other. For example, in one embodiment, the data interconnect 18 may transfer 16 bytes of data per clock cycle. In such an embodiment, 128 parallel-driven conductors may comprise a segment. In one particular embodiment, additional conductors may be included in each segment for error correction code (ECC) bits as well. Additionally, a command, transaction ID, valid signals, etc. may be transmitted on the data interconnect 18, either as part of the segments or separately, in broadcast fashion, to each agent 12A-12D.

It is noted that muxes will be used in the example below as a selection circuit. However, generally any circuitry that receives two or more inputs and a selection control input to select among the two or more inputs may be used to form a selection circuit.

Figure 2:
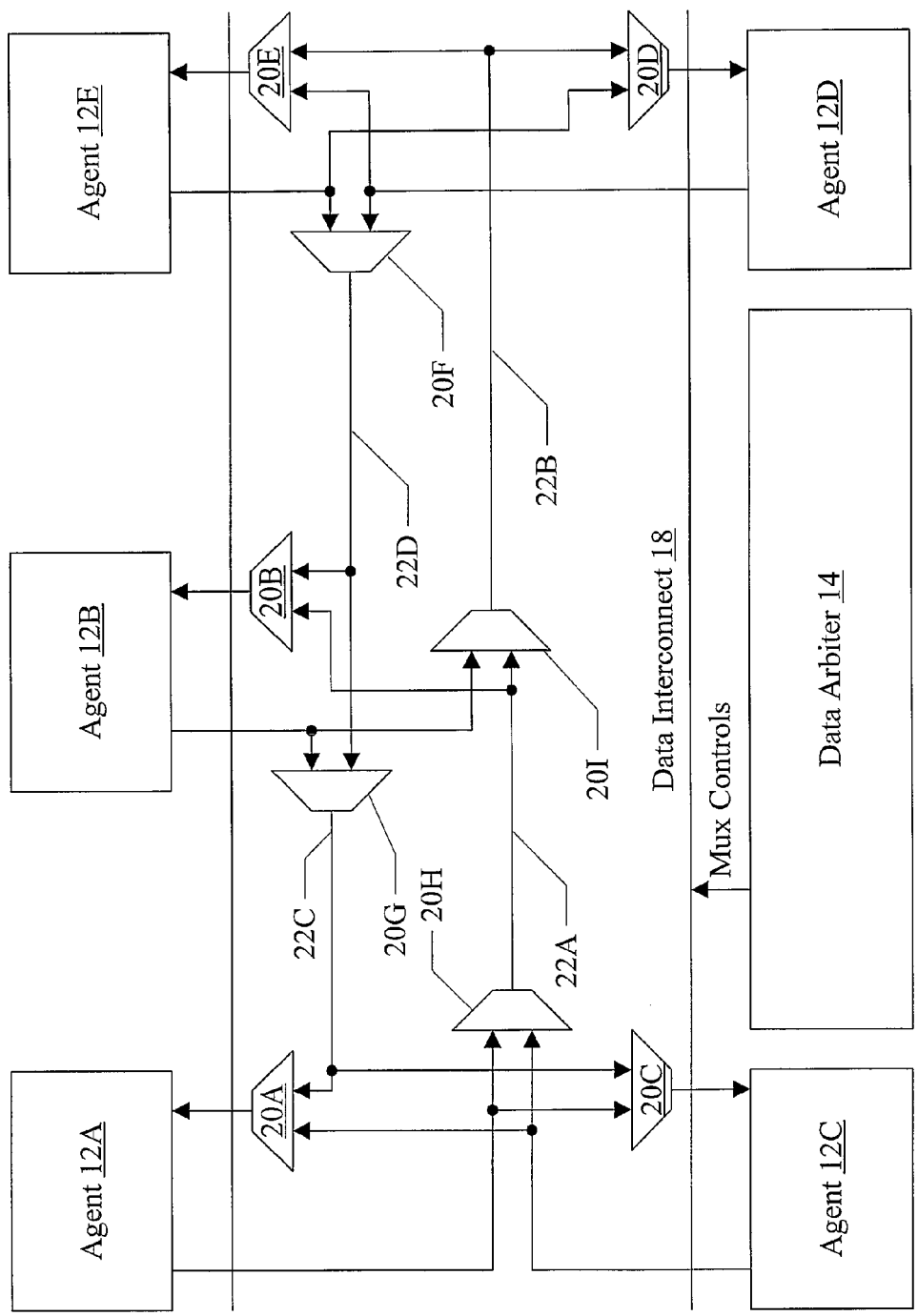
FIG. 2 is a block diagram of one embodiment of a data interconnect shown in FIG. 1.

Turning now to FIG. 2, a block diagram of one embodiment of the data interconnect 18 is shown in more detail. An additional agent 12E is shown in FIG. 2, along with the agents 12A-12D. Any number of agents may be included in various embodiments. The agent 12E may be coupled to the data arbiter 14 in a manner similar to the other agents 12A-12D (not shown in FIG. 2). In the illustrated embodiment, the data interconnect 18 comprises a set of muxes 20A-20I. The muxes 20A-20E are coupled to drive data inputs of the agents 12A- 12E, respectively, in FIG. 2. The muxes 20F-20I are each coupled to drive a segment of the data interconnect 18 (e.g. segments 22A-22D shown in FIG. 2). Each input to the muxes 20A-20I is either a segment 22A-22D or a data output of one of the agents 12A-12D. Particularly, in the illustrated embodiment, the mux inputs are as follows: the mux 20A has the data output of the agent 12C and the segment 22C as inputs; the mux 20B has the segments 22A and 22D as inputs; the mux 20C has the data output of the agent 12A and the segment 22C as inputs; the mux 20D has the data output of the agent 12E and the segment 22B as inputs; the mux 20E has the data output of the agent 12D and the segment 22B as inputs; the mux 20F has the data outputs of the agents 12D-12E as inputs; the mux 20G has the data output of the agent 12B and the segment 22D as inputs; the mux 20H has the data outputs of the agents 12A and 12C as inputs; and the mux 20I has the data output of the agent 12B and the segment 22A as inputs. Each mux 20A-20I has a mux control that selects among its inputs. The data arbiter 14 may provide the mux controls to establish communication paths on the data interconnect 18. Individual controls to individual muxes 20A-20I are not shown in FIG. 2 for simplicity in the drawing.

The data arbiter 14 may control the muxes 20A-20I to establish a communication path on the data interconnect 18 from the agent 12A-12E that is the arbitration winner determined by the data arbiter 14 (the "winning agent") to the destination agent 12A-12E that is to receive the data driven by the winning agent 12A-12E. That is, the data arbiter 14 may control the muxes 20A-20I to couple the data output of the winning agent to the data input of the destination agent. In one embodiment, each requesting agent may identify the destination agent for the data transfer to the data arbiter 14 along with the request. For example, for read operations, the requesting agent may provide an agent ID from the transaction ID provided by the source agent in the address phase of the transaction. For write operations, the source agent may be provided with an indication of the destination agent (e.g. by the address arbiter, in the centralized embodiment described above with regard to FIG. 1, or by the target agent). The source agent may provide the destination agent ID along with the request to the data arbiter 14.

For example, in the embodiment of FIG. 2, a communication path from the agent 12A to the agent 12D may be established by controlling the mux 20H to select the data output of the agent 12A; controlling the mux 20I to select the segment 22A; and controlling the mux 20D to select the segment 22B. As another example, a communication path from the agent 12B to the agent 12C may be established by controlling the mux 20G to select the data output from the agent 12B and controlling the mux 20C to select the segment 22C.

The data interconnect 18 may be viewed as a partially-populated crossbar. That is, each agent 12A-12E drives data on its data output, and the data interconnect 18 routes the data over one or more segments to the destination agent 12A-12E. The data interconnect 18 may provide partial parallelism, but may not provide the complete parallelism of a full crossbar. For example, if the agent 12B is transmitting data to the agent 12D, the agents 12A and 12C may not transmit data to the agent 12E in parallel, in the embodiment of FIG. 2 (since the segment 22B is used to communicate from the agent 12B to the agent 12D and is also used to communicate from the agents 12A and 12C to the agent 12E). However, the agent 12E may transmit data to the agents 12A or 12C (over the segments 22C-22D) in parallel with the agent 12B transmitting data to the agent 12D.

The amount of parallelism provided on the data interconnect 18 may be varied from embodiment to embodiment. Generally, parallelism may be increased by increasing the number of segments and muxes included in the data interconnect 18. Muxes and segments may be added in any desired fashion to provide additional paths between a given agent and another given agent, a given agent and any other agent, or a given agent and a subset of other agents. The amount of parallelism provided may be determined by the desired level of performance (e.g. in terms of increased bandwidth) and/or by the concurrent traffic expected under various workloads. For example, in one embodiment, the system 10 may include two processors, an L2 cache, an I/O bridge, and two memory controllers. In the embodiment, it may be desirable to provide at least the following parallelism: (i) while a processor is transmitting data to the L2 cache, the L2 cache is able to transmit data to the memory controller; (ii) while the L2 cache is transmitting data to one processor, the memory controller is able to transmit data to the other processor; and (iii) while the L2 cache is transmitting data to the I/O bridge, the memory controller is able to transmit data to a processor.

In the illustrated embodiment, at least some segments 22A-22D are shared among communication paths from different requesting agents to different receiving agents. For example, the segment 22B is shared among paths from any of the agents 12A-12C to either of the agents 12D-12E. That is, a communication path from any agent 12A-12C to the agent 12D uses the segment 22D. Additionally, a communication path from any agent 12A-12C to the agent 12E also uses the segment 22B. Similarly, the segment 22A is used in the communication paths from either agent 12A or 12C to any of the agents 12B, 12E, or 12D. The segment 22A is not used by the agent 12B. The sharing of segments among communication paths from different requesting agents to different destination agents may reduce the amount of wiring used to implement the data interconnect 18, in some embodiments, which may simplify wiring and may reduce overall power consumption.

The data interconnect 18 may be a distributed crossbar. The muxes 20A-20I may be physically distributed along the physical distance traversed by the data interconnect 18. For example, muxes that have a data output of an agent 12A-12E as an input may be physically located near that agent. Thus, the mux 20F may be physically located near the agents 12E and 12D; the muxes 20G and 20I may be physically located near the agent 12B; and the mux 20H may be physically located near the agents 12A and 12C. Muxes that drive a data input of an agent 12A-12E may be physically located near that agent. For example, muxes 20A-20E may be physically located near agents 12A-12E, respectively. The segments 22A-22D may carry the data from the source mux down a portion of the physical distance of the data interconnect 18 to the next mux, as illustrated in FIG. 2.

The muxes 20A-20I may form a hierarchical muxing structure. In a traditional crossbar, as set of input muxes select from the inputs to the crossbar, and additional muxes may be used to select between the outputs of the input muxes to produce the crossbar output to a given destination. At least some of the muxes 20A-20I select between a mux output (a segment 22A-22D) and an output from an agent. For example, in the embodiment of FIG. 2, the mux 20I selects between the segment 22A (the output of the preceding mux 20H) and an output from the agent 12B. Similarly, the muxes 20D-20E select between the segment 22B and the outputs of agents 12E and 12D, respectively.

The data interconnect 18 may also be directional in nature. That is, data is driven from a given agent 12A-12E on the data interconnect 18 in the direction of the destination agent (and not in the other direction). The muxes 20F-20G and the segments 22C-22D provide for data transmission to the left (as illustrated in FIG. 2) and the muxes 20H-20I and the segments 22A-22B provide for data transmission to the right (as illustrated in FIG. 2). That is, non-overlapping subsets of the segments 22A-22D are used for communication in each direction. For example, if the agent 12B is transmitting data to the agent 12A or 12C, the data is driven through the mux 22C, on the segment 22C, and through the mux 20A or 20C. Similarly, if the agent 12B is transmitting data to the agent 12E or 12D, the data is driven through the mux 20I, on the segment 22B, and through the mux 20E or 20D. The data may be driven only on the portion of the data interconnect 18 used to transport the data from the requesting agent to the destination agent. For example, data from the agent 12B is not driven on the segments 22D or 22A.

It is noted that additional agents may be included in other embodiments. Each additional agent may be supported with additional muxes similar to muxes 20G and 20I, and additional segments driven by those muxes.

In some embodiments, the data interconnect 18 may be pipelined. For example, if the flight time from one end of the data interconnect 18 to the other exceeds a clock cycle of the clock used for the data interconnect 18, pipelining may be desired. Flops or other clocked storage devices may be inserted as desired in the data interconnect 18 to pipeline the interconnect.

It is noted that, while the data arbiter 14 is shown as providing the mux controls to the muxes 20A-20I in the illustrated embodiment, the circuitry that generates the mux controls may be separate from the data arbiter 14. The circuitry may be informed of the grant to a winning agent and of the corresponding destination agent, and may control the muxes to establish the communication path from the winning agent to the destination agent.

It is noted that, while two input muxes are shown in the embodiment of FIG. 2, other embodiments may include muxes having more than two inputs. Such muxes may be coupled to two or more segments and/or two or more data outputs of agents as inputs.

Figure 3:
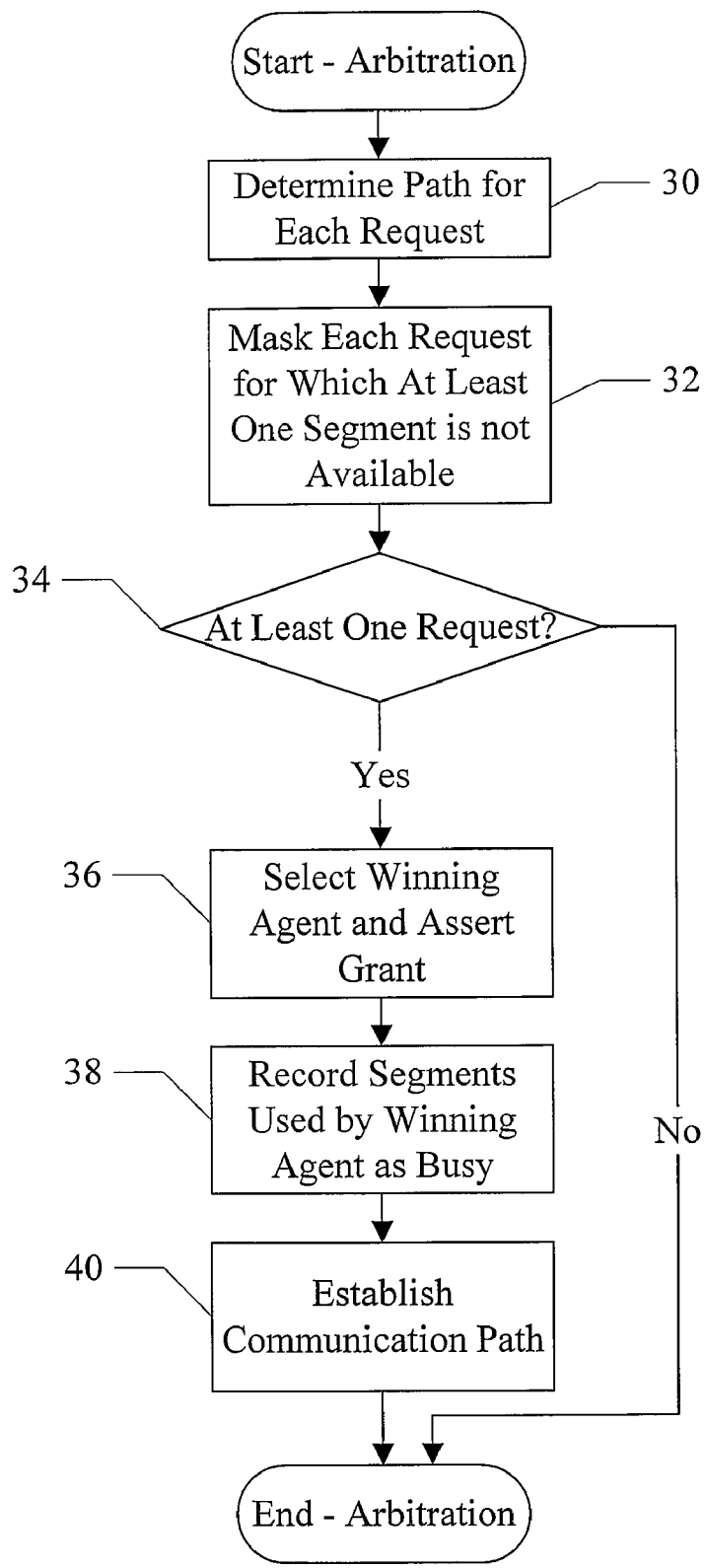
FIG. 3 is a flowchart illustrating operation of one embodiment of a data arbiter shown in FIGS. 1 and 2 for arbitration of the data interconnect.

Turning next to FIG. 3, a flowchart is shown illustrating operation of one embodiment of the data arbiter 14 performing an arbitration for the data interconnect 18. While the blocks are shown in FIG. 3 in a particular order for ease of understanding, other orders may be used. Furthermore, blocks may be performed in parallel by combinatorial logic circuitry in the data arbiter 14. Blocks, portions of the flowchart, or the flowchart as a whole may be pipelined over multiple clock cycles, if desired.

For each asserted request, the data arbiter 14 may determine a path from the requesting agent to the destination agent (block 30). Each requesting agent may have its own request signal, and thus the data arbiter 14 may identify the requesting agent based on the assertion of the corresponding request signal. The requesting agent may also provide an identification of the destination agent. The data arbiter may mask each request for which at least one segment of the corresponding communication path is not available to be allocated to the communication path for the requesting agent (block 32). Thus, only requests for which the communication path may be established are considered in the arbitration. A segment may not be available if it is allocated for use in the communication path for another data transfer.

In the embodiment of FIG. 2, there is one path from a given requesting agent to a given destination agent. In embodiments in which additional segments and muxes are provided for additional parallelism, if more than one path is possible from a given requesting agent to a given destination agent, the data arbiter 14 may consider each possible path in determining a communication path. The data arbiter 14 may select a communication path, for arbitration purposes, for which all segments are available, if possible.

If there is at least one asserted request that is not masked (decision block 34, "yes" leg), the data arbiter 14 may select a winning agent and assert a grant to the winning agent (block 36). The winning agent is selected from a subset of the requesting agents, where the members of the subset are the requesting agents whose asserted request signals are not masked due to the unavailability of at least one segment in the communication path from that requesting agent to the destination agent for the data transfer. The winning agent is determined using the arbitration scheme implemented by the data arbiter 14. The data arbiter 14 may also record the segments used in the communication path from the winning agent to its destination agent as "busy" (or "not available") for consideration of communication paths in subsequent arbitrations (block 38). For example, the data arbiter 14 may maintain a bit for each segment, for arbitration purposes, indicating whether the segment is busy or available. The data arbiter 14 may generate the mux controls for the muxes 20A-20I to establish the communication path from the winning agent to its destination agent (block 40). In some embodiments, the actual establishment of the communication path may be delayed from the determination of the winning agent. For example, in one embodiment, a winning agent begins its data transfer two clock cycles after receiving the grant. The establishment of the communication path may similarly be delayed. Alternatively, the clock cycle between the grant and the beginning of the data transfer may be used to set up the communication path. If there are no asserted and unmasked requests (decision block 34, "no" leg), then no winning agent may be declared.

In one embodiment, the data arbiter 14 may grant one requesting agent per clock cycle. Concurrency of data transfer, in cases in which independent communication paths are available (i.e. no shared segments), may occur via additional grants asserted by the data arbiter 14 in subsequent clock cycles. In other embodiments, the data arbiter 14 may be configured to issue multiple grants per clock cycle.

Figure 4:
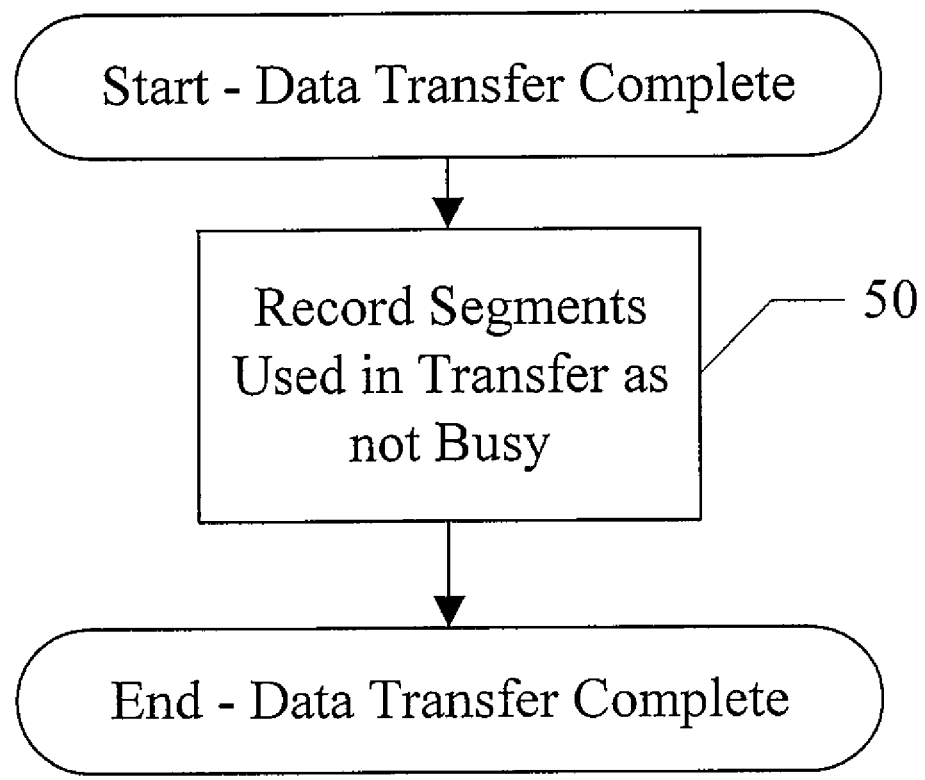
FIG. 4 is a flowchart illustrating operation of one embodiment of a data arbiter shown in FIGS. 1 and 2 when a data transfer is completing.

Turning next to FIG. 4, a flowchart is shown illustrating operation of one embodiment of the data arbiter 14 in response to the end of a data transfer on the data interconnect 18. In some embodiments, the data arbiter 14 may be aware, in advance, that a data transfer will complete on a given clock cycle and may detect that the data transfer will end on the given clock cycle. For example, in FIG. 7, an arbitration interface is shown in which the requesting agent may indicate that a data transfer will occur as a burst of a known number of consecutive clock cycles (e.g. 4 clock cycles, for 16 bytes of transfer per clock and a 64 byte cache block transfer). In such cases, the data arbiter 14 may detect that the data transfer will end prior to the initiating of a subsequent transfer and may perform the operation illustrated in FIG. 4 in response to such detection. Such operation may permit the pipelining of grants for communication paths that share one or more segments. In other cases, the data arbiter 14 may track valid data transfers (e.g. a data valid signal may indicate a transfer of data on the data interconnect 18) to detect the end of a data transfer, or the transferring agent may signal the data arbiter 14 that a data transfer is ending. If the data arbiter 14 detects that a data transfer is ending, the data arbiter 14 may record the segments used in the transfer to form the communication path as "not busy" or "available" (block 50). Thus, the segments become available for allocation to communication paths for requesting agents. In some embodiments, the data arbiter 14 may also generate mux controls to the muxes 20A-20I to keep the communication path even after the end of the data transfer on that data path (for example, if power may be conserved by doing so).

Figure 5:
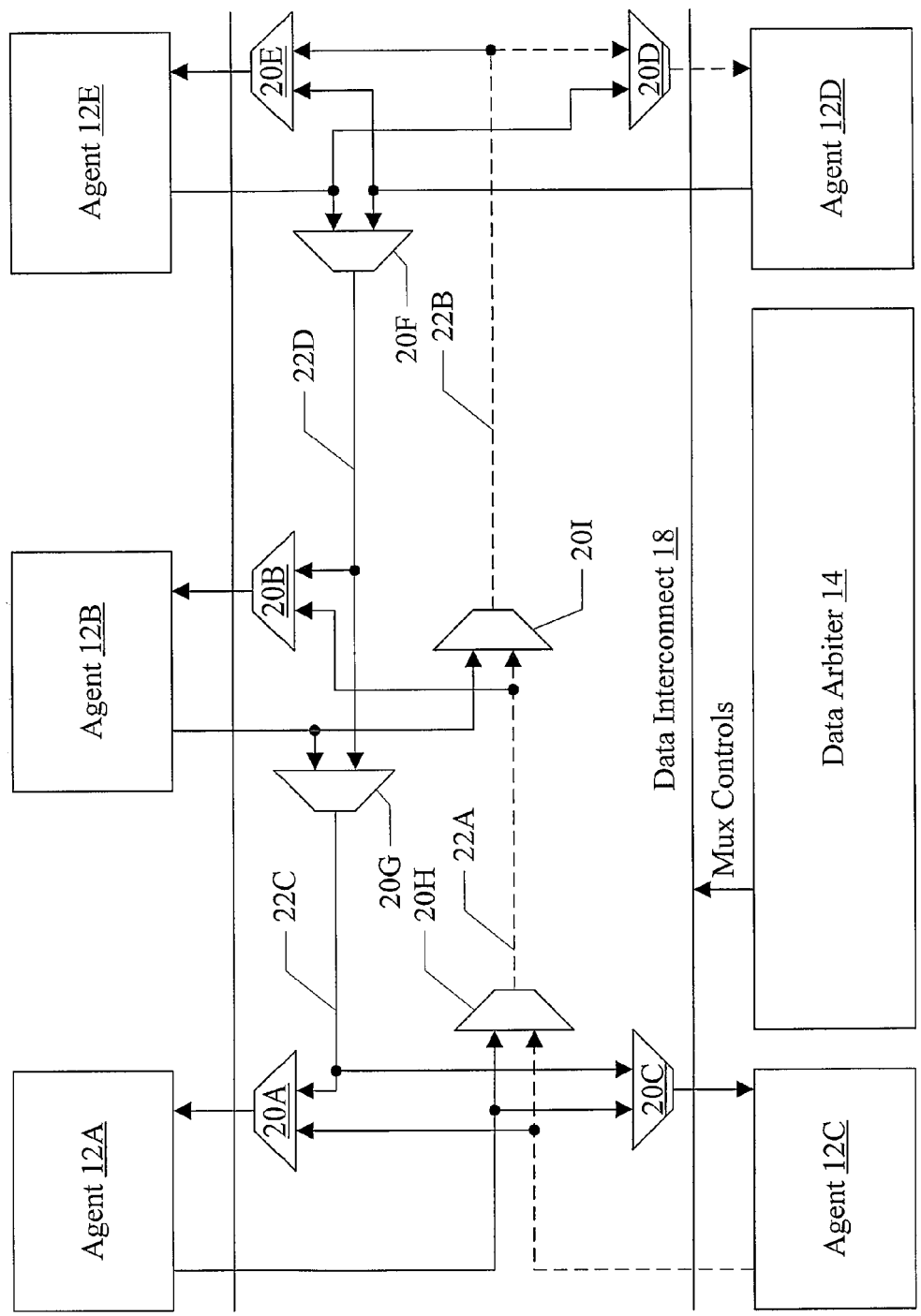
FIG. 5 is a block diagram illustrating one example of a first communication path configured on the data interconnect.

FIG. 5 is a block diagram similar to FIG. 2, illustrating an example of a first communication path on the data interconnect 18. In the example of FIG. 5, the communication path is established from the agent 12C to the agent 12D, illustrated by dashed lines in FIG. 5. The data arbiter 14 controls the mux 20H to select the data output of the agent 12C onto the segment 22A. The data arbiter 14 controls the mux 20I to select the segment 22A onto the segment 22B. The data controls the mux 20D to select the segment 22B onto the data input of the agent 12D. In this fashion, a communication path is established from the data output of the agent 12C through the muxes 20H-20I and 20D and across the segments 22A-22B.

Figure 6:
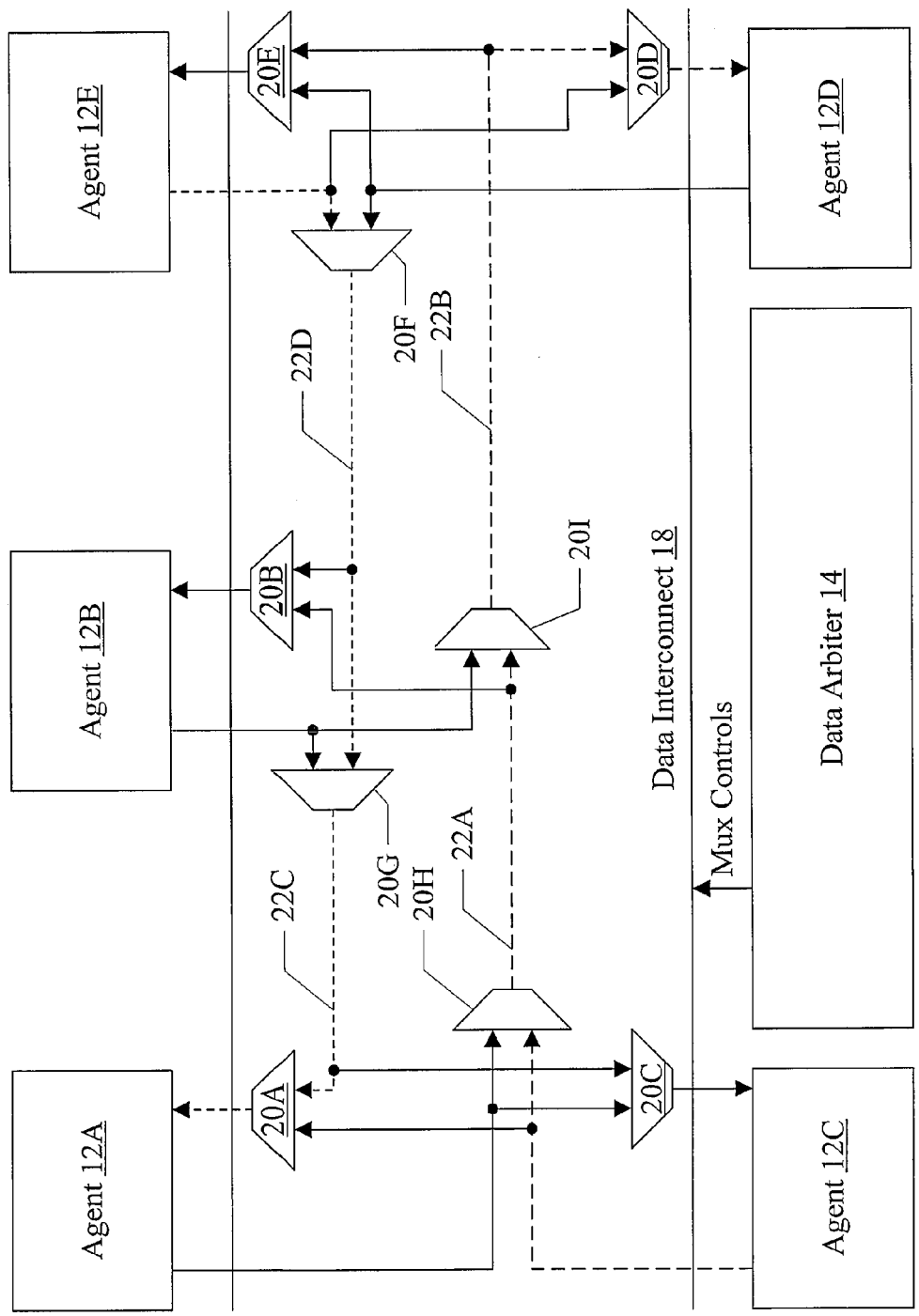
FIG. 6 is a block diagram illustrating one example of a second communication path configured on the data interconnect concurrent with the first communication path.

FIG. 6 is a block diagram similar to FIGS. 2 and 5, illustrating an example of a second communication path on the data interconnect 18 concurrent with the first communication path illustrated in FIG. 5. In the example of FIG. 6, the second communication path is from the agent 12E to the agent 12A, as illustrated by the smaller dashed lines in FIG. 6 (as compared to the dashed lines for the first communication path). The data arbiter 14 controls the mux 20F to select the data output of the agent 12E onto the segment 22D. The data arbiter 14 controls the mux 20G to select the segment 22D onto the segment 22C. The data controls the mux 20A to select the segment 22C onto the data input of the agent 12A.

In this fashion, a communication path is established from the data output of the agent 12E through the muxes 20F-20G and 20A and across the segments 22C-22D, concurrent with the first communication path.

Figure 7:
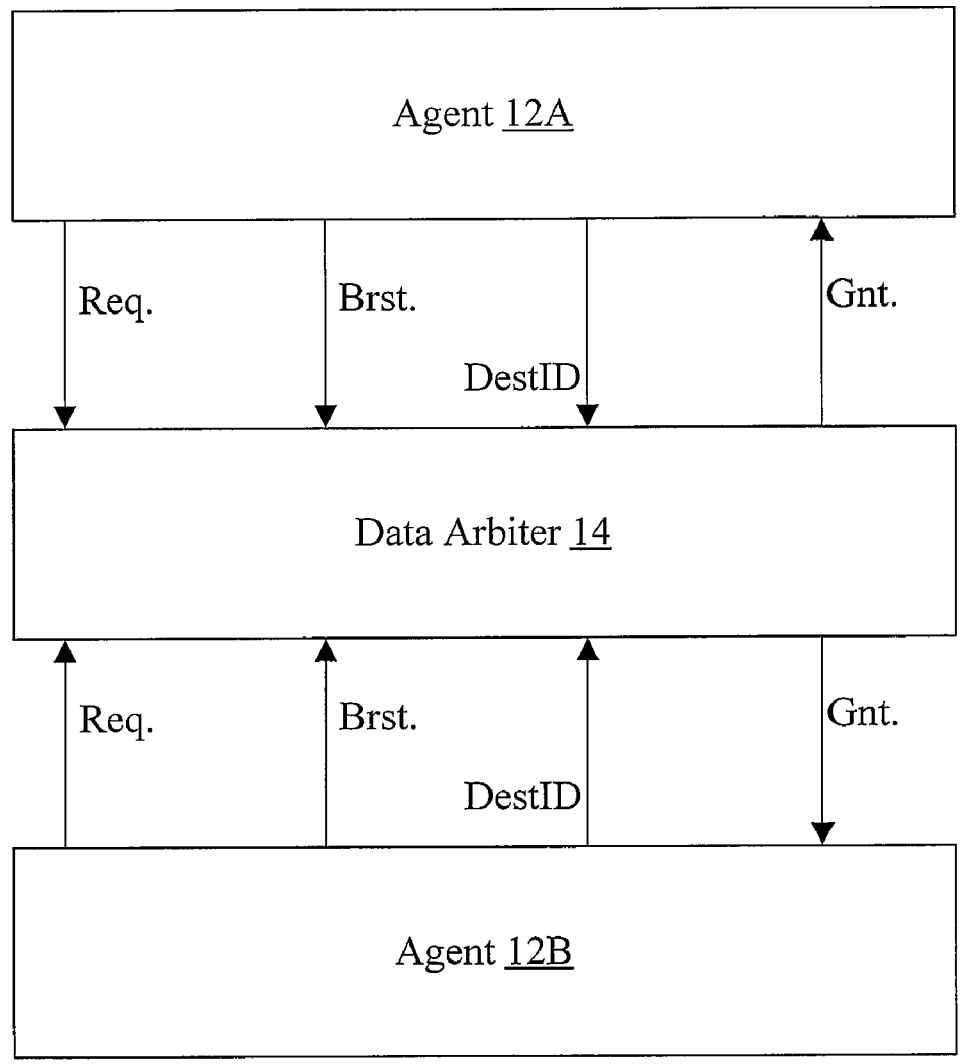
FIG. 7 is a block diagram illustrating one embodiment of an arbitration interface to the data arbiter.

Turning now to FIG. 7, a block diagram illustrating an exemplary arbitration interface for one embodiment of the data arbiter 14 is shown. In the illustrated embodiment, the interface includes individual signals between the data arbiter 14 and each agent (which are replicated for each agent, such as agents 12A-12B in FIG. 7). In the illustrated embodiment, the signals include a request signal (Req.), a burst signal (Brst.), a destination identifier (DestID), and a grant signal (Gnt.).

Each agent may request the data interconnect 18 by asserting its request signal. Concurrent with the request signal, the agent may identify the destination agent for the data transfer being requested using the destination ID, and may also indicate whether or not data will be transferred as a burst on consecutive clock cycles using the burst signal. The data arbiter 14 may use the burst signal to determine when the data transfer is expected to end, in some embodiments. In other embodiments, the burst signal may not be included. The data arbiter 14 may signal a grant to the arbitration winner by asserting its grant signal.

Numerous variations and modifications will become apparent to those skilled in the art once the above disclosure is fully appreciated. It is intended that the following claims be interpreted to embrace all such variations and modifications.

What is claimed is:

1. An apparatus comprising:
   an interconnect comprising:
      a first selection circuit having inputs connected to at least a first output of a first agent and a second output of a second agent;
      a first segment driven by the first selection circuit;
      a second selection circuit having the first segment as an input and at least a third output of a third agent as an input; and
      a second segment driven by the second selection circuit; and
   an arbiter coupled to the first and second selection circuits and configured to control the first and second selection circuits to transmit a communication that is an arbitration winner determined by the arbiter.

2. The apparatus as recited in claim 1 wherein the interconnect further comprises:
   a third selection circuit having inputs connected to at least a fourth output of a fourth agent and a fifth output of a fifth agent;
   a third segment driven by the third selection circuit;
   a fourth selection circuit having the third segment as an input and at least the third output as an input; and
   a fourth segment driven by the fourth selection circuit;
   wherein the arbiter is coupled to the third and fourth selection circuits and is configured to control the third and fourth selection circuits to transmit one or more communications that are arbitration winners.

3. The apparatus as recited in claim 2 wherein the arbiter is configured to detect at least two arbitration winners concurrently, and wherein the arbiter is configured to control the first, second, third, and fourth selection circuits to transmit the at least two arbitration winners concurrently.

4. The apparatus as recited in claim 2 wherein the first, second, third, fourth, and fifth agents are physically distributed on a semiconductor substrate, and wherein the first and second segments carry communications in a first direction on the semiconductor substrate and the third and fourth segments carry communications in a second direction on the semiconductor substrate.

5. The apparatus as recited in claim 4 wherein the first direction is an opposite direction than the second direction.

6. The apparatus as recited in claim 4 wherein the third agent is physically located along a path formed by the first segment and the second segment.

7. The apparatus as recited in claim 4 wherein a communication from a given agent of the first, second, third, fourth, and fifth agents to a receiving agent of the first, second, third, fourth, and fifth agents is driven from the given agent in the direction of the receiving agent.

8. The apparatus as recited in claim 4 wherein the first, second, third, and fourth segments are part of a plurality of segments, and wherein a first subset of the plurality of segments carry communications in the first direction among the plurality of agents, and wherein a second subset of the plurality of segments carry communications in the second direction among the plurality of agents, wherein the subsets are non-overlapping.

9. The apparatus as recited in claim 2 wherein the interconnect further comprises a fifth selection circuit and a sixth selection circuit, wherein the first segment is an input to the fifth selection circuit and an input to the sixth selection circuit, and wherein the fifth selection circuit drives an input to the fourth agent, and wherein the sixth selection circuit drives an input to the fifth agent, and wherein the arbiter is coupled to the fifth and sixth selection circuits and is configured to control the fifth and sixth selection circuits to transmit the communications.

10. The apparatus as recited in claim 9 wherein the fifth output is an input to the fifth selection circuit and the fourth output is an input to the sixth selection circuit.

11. The apparatus as recited in claim 2 wherein the interconnect further comprises a fifth selection circuit having at least the first segment and the third segment as inputs, wherein the fifth selection circuit drives an input to the third agent, and wherein the arbiter is coupled to the fifth selection circuit and is configured to control the fifth selection circuit to transmit the communications.

12. The apparatus as recited in claim 11 wherein the interconnect further comprises a sixth selection circuit and a seventh selection circuit, wherein the fourth segment is an input to the sixth selection circuit and an input to the seventh selection circuit, wherein the sixth selection circuit drives an input to the first agent and the seventh selection circuit drives an input to the second agent, and wherein the arbiter is coupled to the sixth and seventh selection circuits and is configured to control the sixth and seventh selection circuits to transmit the communications.

13. The apparatus as recited in claim 12 wherein the first output is an input to the seventh selection circuit and the second output is an input to the sixth selection circuit.

14. The apparatus as recited in claim 1 wherein the arbiter is coupled to receive requests to use the interconnect from agents coupled to the interconnect, and wherein the arbiter is configured to arbitrate among the requests to select a requesting agent to use the interconnect, wherein requests that participate in the arbitration exclude requests for which at least one segment used to transmit the requested communication is not available.

15. The apparatus as recited in claim 14 wherein the at least one segment is not available if at least one segment is included in a different communication path for a communication that is not complete.

16. The apparatus as recited in claim 1 wherein the interconnect is a data interconnect.

17. The apparatus as recited in claim 1 further comprising the first agent and the second agent.

18. In an apparatus comprising an interconnect comprising a first selection circuit having inputs connected to at least a first output of a first agent and a second output of a second agent, a first segment driven by the first selection circuit, a second selection circuit having the first segment as an input and at least a third output of a third agent as an input, and a second segment driven by the second selection circuit, a method comprising:
   arbitrating among one or more communications to determine an arbitration winner; and
   controlling the first and second selection circuits to transmit the arbitration winner.

19. The method as recited in claim 18 wherein the interconnect further comprises: a third selection circuit having inputs connected to at least a fourth output of a fourth agent and a fifth output of a fifth agent, a third segment driven by the third selection circuit, a fourth selection circuit having the third segment as an input and at least the third output as an input, and a fourth segment driven by the fourth selection circuit, the method further comprising controlling the third and fourth selection circuits to transmit one or more communications that are arbitration winners.

20. The method as recited in claim 19 further comprising:
   detecting at least two arbitration winners concurrently; and
   controlling the first, second, third, and fourth selection circuits to transmit the at least two arbitration winners concurrently.

* * * * *